US006440342B1

(12) United States Patent
Beer

(10) Patent No.: US 6,440,342 B1
(45) Date of Patent: Aug. 27, 2002

(54) PROCESS FOR MAKING A LOW DENSITY DETERGENT COMPOSITION BY CONTROLLING NOZZLE HEIGHT IN A FLUID BED DRYER

(75) Inventor: Allen Dale Beer, Miamitown, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/462,935

(22) PCT Filed: Jul. 8, 1998

(86) PCT No.: PCT/US98/14100

§ 371 (c)(1),
(2), (4) Date: Jan. 14, 2000

(87) PCT Pub. No.: WO99/03966

PCT Pub. Date: Jan. 28, 1999

(51) Int. Cl.[7] .............................. C11D 11/00; B29B 9/08

(52) U.S. Cl. ......................... 264/117; 264/121; 264/122; 264/DIG. 51; 510/444

(58) Field of Search ................................. 510/444, 445, 510/509; 264/109, 115, 117, 140, DIG. 51, 122, 121

(56) References Cited

U.S. PATENT DOCUMENTS

| | | | |
|---|---|---|---|
| 4,846,409 A | 7/1989 | Kaspar et al. | 241/21 |
| 5,576,285 A | 11/1996 | France et al. | 510/444 |

FOREIGN PATENT DOCUMENTS

| | | | |
|---|---|---|---|
| DE | DT 24 43 073 A1 | 3/1975 | C11D/1/00 |
| DE | 44 35 743 A1 | 8/1995 | C11D/3/08 |
| GB | 2 209 172 A | 5/1989 | C11D/11/00 |
| WO | WO 96/04359 A1 | 2/1996 | C11D/11/04 |
| WO | WO 97/12956 | 4/1997 | C11D/11/00 |
| WO | WO 97/22685 | 6/1997 | C11D/17/06 |
| WO | WO 97/30145 | 8/1997 | C11D/11/00 |
| WO | WO 98/14549 | 4/1998 | C11D/11/00 |
| WO | WO 98/14552 | 4/1998 | C11D/11/00 |
| WO | WO 98/14553 | 4/1998 | C11D/11/00 |
| WO | WO 98/14554 | 4/1998 | C11D/11/00 |
| WO | WO 98/14555 | 4/1998 | C11D/11/00 |
| WO | WO 98/14556 | 4/1998 | C11D/11/00 |
| WO | WO 98/14557 | 4/1998 | C11D/11/00 |
| WO | WO 98/14558 | 4/1998 | C11D/11/00 |
| WO | WO 98/58046 | 12/1998 | C11D/11/00 |
| WO | WO 98/58047 | 12/1998 | C11D/11/00 |
| WO | WO 98/58048 | 12/1998 | C11D/11/00 |
| WO | WO 99/00475 | 1/1999 | C11D/11/04 |

*Primary Examiner*—Mathieu D. Vargot
(74) *Attorney, Agent, or Firm*—Brian M. Bolam; Kim William Zerby; Steven W. Miller

(57) ABSTRACT

A process for preparing low density detergent agglomerates having a density in a range from about 300 g/l to about 550 g/l is provided. The process involves the steps of: (a) agglomerating a detergent surfactant paste or precursor thereof and dry starting detergent material in a first high speed mixer to obtain agglomerates; (b) mixing the agglomerates in a second high speed mixer to obtain built-up agglomerates; and (c) feeding the built-up agglomerates into a fluid bed dryer in which a binder is sprayed via a nozzle having a height of from about 25 cm to about 60 cm from the distributor plate of the fluid bed dryer such that the built-up agglomerate are dried and agglomerated to form the desired low detergent agglomerates.

18 Claims, No Drawings

PROCESS FOR MAKING A LOW DENSITY DETERGENT COMPOSITION BY CONTROLLING NOZZLE HEIGHT IN A FLUID BED DRYER

FIELD OF THE INVENTION

The present invention generally relates to a process for producing a low density detergent composition. More particularly, the invention is directed to a process during which low density detergent agglomerates are produced by feeding a surfactant paste or liquid acid precursor of anionic surfactant and dry starting detergent material sequentially into two high speed mixers followed by a fluid bed dryer which has an optimally selected nozzle height for spraying on a binder. The process produces a free flowing, low density detergent composition which can be commercially sold as a conventional non-compact detergent composition or used as an admix in a low dosage, "compact" detergent product.

BACKGROUND OF THE INVENTION

Recently, there has been considerable interest within the detergent industry for laundry detergents which are "compact" and therefore, have low dosage volumes. To facilitate production of these so-called low dosage detergents, many attempts have been made to produce high bulk density detergents, for example with a density of 600 g/l or higher. The low dosage detergents are currently in high demand as they conserve resources and can be sold in small packages which are more convenient for consumers. However. the extent to which modern detergent products need to be "compact" in nature remains unsettled. In fact, many consumers, especially in developing countries, continue to prefer a higher dosage levels in their respective laundering operations. Consequently, there is a need in the art of producing modem detergent compositions for flexibility in the ultimate density of the final composition.

Generally, there are two primary types of processes by which detergent granules or powders can be prepared. The first type of process involves spray-drying an aqueous detergent slurry in a spray-drying tower to produce highly porous detergent granules. In the second type of process, the various detergent components are dry mixed after which they are agglomerated with a binder such as a nonionic or anionic surfactant. In both processes, the most important factors which govern the density of the resulting detergent granules are the density, porosity and surface area, shape of the various starting materials and their respective chemical composition. These parameters, however, can only be varied within a limited range. Thus, flexibility in the substantial bulk density can only be achieved by additional processing steps which lead to lower density of the detergent granules.

There have been many attempts in the art for providing processes which increase the density of detergent granules or powders. Particular attention has been given to densification of spray-dried granules by post tower treatment. For example, one attempt involves a batch process in which spray-dried or granulated detergent powders containing sodium tripolyphosphate and sodium sulfate are densified and spheronized in a Marumerizer®. This apparatus comprises a substantially horizontal, roughened, rotatable table positioned within and at the base of a substantially vertical, smooth walled cylinder. This process, however, is essentially a batch process and is therefore less suitable for the large scale production of detergent powders. More recently, other attempts have been made to provide continuous processes for increasing the density of "post-tower" or spray dried detergent granules. Typically, such processes require a first apparatus which pulverizes or grinds the granules and a second apparatus which increases the density of the pulverized granules by agglomeration. While these processes achieve the desired increase in density by treating or densifying "post tower" or spray dried granules, they do not provide a process which has the flexibility of providing lower density granules.

Moreover, all of the aforementioned processes are directed primarily for densifying or otherwise processing spray dried granules. Currently, the relative amounts and types of materials subjected to spray drying processes in the production of detergent granules has been limited. For example, it has been difficult to attain high levels of surfactant in the resulting detergent composition, a feature which facilitates production of detergents in a more efficient manner. Thus, it would be desirable to have a process by which detergent compositions can be produced without having the limitations imposed by conventional spray drying techniques.

To that end, the art is also replete with disclosures of processes which entail agglomerating detergent compositions. For example, attempts have been made to agglomerate detergent builders by mixing zeolite and/or layered silicates in a mixer to form free flowing agglomerates. While such attempts suggest that their process can be used to produce detergent agglomerates, they do not provide a mechanism by which conventional starting detergent materials in the form of surfactant pastes or precursors thereof, liquids and dry materials can be effectively agglomerated into crisp, free flowing detergent agglomerates having low densities rather than high densities. In the past, attempts at producing such low density agglomerates involves a nonconventional detergent ingredient which is typically expensive, thereby adding to the cost of the detergent product. One such example of this involves a process of agglomerating with inorganic double salts such as Burkeite to produce the desired low density agglomerates.

Accordingly, there remains a need in the art to have a process for producing a low density detergent composition directly from starting detergent ingredients without the need for relatively expensive specialty ingredients. Also, there remains a need for such a process which is more efficient, flexible and economical to facilitate large-scale production of detergents of low as well as high dosage levels.

BACKGROUND ART

The following references are directed to densifying spray-dried granules: Appel et al. U.S. Pat. No. 5,133,924 (Lever); Bortolotti et al, U.S. Pat. No. 5,160,657 (Lever): Johnson et al, British patent No. 1,517,713 (Unilever); and Curtis, European Patent Application 451,894. The following references are directed to producing detergents by agglomeration: Beerse et al, U.S. Pat. No. 5,108,646 (Procter & Gamble); Capeci et al. U.S. Pat. No. 5,366,652 (Procter & Gamble); Hollingsworth et al, European Patent Application 351,937 (Unilever); and Swatling et al, U.S. Pat. No. 5,205, 958. The following references are directed to inorganic double salts: Evans et al, U.S. Pat. No. 4,820,441 (Lever); Evans et al, U.S. Pat. No. 4,818,424 (Lever); Atkinson et al, U.S. Pat. No. 4,900,466 (Lever); France et al, U.S. Pat. No. 5,576,285 (Procter & Gamble); and Dhalewadika et al, PCT WO 96/04359 (Unilever).

SUMMARY OF THE INVENTION

The present invention meets the aforementioned needs in the art by providing a process which produces a low density (below about 600 g/l) detergent composition directly from a surfactant paste and dry starting detergent ingredients. In essence, the process involves agglomerating the starting detergent ingredients in a high speed mixer followed by a second high speed mixer. Thereafter, the agglomerates formed in the high speed mixers are agglomerated and dried in a fluid bed dryer in which a liquid binder is sprayed onto the agglomerates from one or more nozzles at a selected height from the distribution plate of the fluid bed dryer. The process does not use the conventional spray drying towers currently used and is therefore more efficient, economical and flexible with regard to the variety of detergent compositions which can be produced in the process. Moreover, the process is more amenable to environmental concerns in that it does not use spray drying towers which typically emit particulates and volatile organic compounds into the atmosphere.

As used herein, the term "agglomerates" refers to particles formed by agglomerating detergent granules or particles which typically have a smaller median particle size than the formed agglomerates. By "median particle size", it is meant the particle size diameter value above which 50% of the particles have a larger particle size and below which 50% of particles have a smaller particle size. All percentages used herein are expressed as "percent-by-weight" on an anhydrous basis unless indicated otherwise.

In accordance with one aspect of the invention, a process for preparing low density detergent agglomerates is provided. The process comprises the steps of: (a) agglomerating a detergent surfactant paste or precursor thereof and dry starting detergent material in a first high speed mixer to obtain agglomerates; (b) mixing the agglomerates in a second high speed mixer to obtain built-up agglomerates; and (c) feeding the built-up agglomerates into a fluid bed dryer in which a binder is sprayed via a nozzle having a height of from about 25 cm to about 60 cm from the distributor plate of the fluid bed dryer such that the built-up agglomerates are dried and agglomerated to form the low detergent agglomerates having a density in a range from about 300 g/l to about 550 g/l.

In accordance with another aspect of the invention, another process for preparring low density detergent agglomerates is provided. The process comprises the steps of: (a) agglomerating a detergent surfactant paste or precursor thereof and dry starting detergent material in a first high speed mixer to obtain agglomerates; (b) mixing the agglomerates in a second high speed mixer to obtain built-up agglomerates; and (c) feeding the built-up agglomerates into a fluid bed dryer in which sodium silicate is sprayed via a nozzle having a height of from about 40 cm to about 60 cm from the distributor plate of the fluid bed dryer such that the built-up agglomerates are dried and agglomerated to form the low detergent agglomerates having a density in a range from about 300 g/l to about 550 g/l. The detergent products made in accordance with any of the process embodiments described herein are also provided.

Accordingly, it is an object of the invention to provide a process for producing a low density detergent composition directly from starting detergent ingredients which does not include relatively expensive specialty ingredients. It is also an object of the invention to provide such a process which is more efficient, flexible and economical so as to facilitate large-scale production of detergents of low as well as high dosage levels. These and other objects, features and attendant advantages of the present invention will become apparent to those skilled in the art from a reading of the following detailed description of the preferred embodiment and the appended claims.

DETAILED DESCRIPTION OF THE PREFERRED EMBODIMENT

The present invention is directed to a process in which low density agglomerates are produced by a three step process, the last of which involves a fluid bed dryer containing one or more nozzles positioned at a selected height from the distribution plate of the dryer. In this way, the process forms free flowing, low density detergent agglomerates which can be used alone as the detergent product or as an admixture with conventional spray-dried detergent granules and/or high density detergent agglomerates in a final commercial detergent product. It should be understood that the process described herein can be operated continuously or in a batch mode depending upon the particularly desired application. One major advantage of the present process is that it utilizes equipment which can be operated differently from the present process parameters to obtain high density detergent compositions. Thus, a single large-scale commercial detergent manufacturing facility can be built to produce high or low density detergent compositions depending upon the local consumer demand and its inevitable fluctuations between compact and non-compact detergent products.

Process

In the first step of the process, a detergent surfactant paste or precursor thereof as set forth in more detail hereinafter and dry starting detergent material is inputted and agglomerated in a high speed mixer. Unlike previous processes in this area, the dry starting material can include only those relatively inexpensive detergent materials typically used in modern granular detergent products. Such ingredients, include but are not limited to, builders, fillers, dry surfactants, and flow aides. Preferably, the builder includes aluminosilicates, crystalline layered silicates, phosphates, carbonates and mixtures thereof which is the essential dry starting detergent ingredient within the scope of the current process. Relatively expensive materials such as Burkeite ($Na_2SO_4.Na_2CO_3$) and the various silicas are not necessary to achieve the desired low density agglomerates produced by the process. Rather, by selecting the binder and nozzle height through which the binder is sprayed onto the agglomerates in the fluid bed dryer as described in more detail hereinafter, the present process achieves the desired low density. Further, it is preferable to include from 1% to about 40% by weight of undersized detergent particles or "fines" in the first step of the process. This can be conveniently accomplished by screening the detergent particles formed subsequent to the fluid bed dryer to a median particle size range of from about 10 microns to about 150 microns and feeding these "fines" back into the first high speed mixer.

The high speed mixer can be any one of a variety of commercially available mixers such as a Lödige CB 30 mixer or similar brand mixer. These types of mixers essentially consist of a horizontal, hollow static cylinder having a centrally mounted rotating shaft around which several shovel and rod-shaped blades are attached which have a tip speed of from about 5 m/s to about 30 m/s, more preferably from about 6 m/s to about 26 m/s. Preferably, the shaft rotates at a speed of from about 100 rpm to about 2500 rpm, more preferably from about 300 rpm to about 1600 rpm. Preferably, the mean residence time of the detergent ingredients in the high speed mixer is preferably in range from about 2 seconds to about 45 seconds, and most preferably from about 5 seconds to about 15 seconds. This mean residence time is conveniently measured by dividing the weight of the mixer at steady state by throughput (kg/hr) flow. Another suitable mixer is any one of the various Flexomix models available from Schugi (Netherlands) which are vertically positioned high speed mixers. This type of mixer is preferably operated at a Froude Index of from about 13 to about 32. See U.S. Pat. No. 5,149,455 to Jacobs et al (issued Sept. 22, 1992) for a detailed discussion of this well-known Froude Index which is a dimensionless number that can be optimally selected by those skilled in the art.

In a preferred embodiment of the process invention, a liquid acid precursor of an anionic surfactant is inputted with the dry starting detergent material which at least includes a neutralizing agent such as sodium carbonate. The preferred liquid acid surfactant precursor is $C_{11-18}$ linear alkylbenzene sulfonate surfactant ("HLAS"), although any acid precursor of an anionic surfactant may be used in the process. A more preferred embodiment involves feeding a liquid acid precursor of $C_{12-14}$ linear alkylbenzene sulfonate surfactant with a $C_{10-18}$ alkyl ethoxylated sulfate ("AS") surfactant into the first high speed mixer, preferably in a weight ratio of from about 5:1 to about 1:5, and most preferably, in a range of from about 1:1 to about 3:1 (HLAS:AS). The result of such mixing is a "dry neutralization" reaction between the HLAS and the sodium carbonate embodied in the dry starting detergent material, all of which forms agglomerates. It is preferable to add the HLAS before the addition of other surfactants such as AS or alkyl ethoxylate sulfate ("AES") surfactants so as to insure optimal mixing and neutralization of the HLAS in the first high speed mixer. In the second step of the process, the detergent agglomerates formed in the first step are inputted into a second high speed mixer which can be the same piece of equipment as used in the first step or a different type of high speed mixer. For example, a Lödige CB mixer can be used in the first step while a Schugi mixer is used in the second step. In this second process step, the agglomerates are mixed and built-up further in a controlled fashion. In this step, a sufficient amount of binder can be inputted to facilitate agglomeration build-up in the mixer. Typical binders include liquid sodium silicate, a liquid acid precursor of an anionic surfactant such as HLAS, nonionic surfactant, polyethylene glycol or mixtures thereof.

In the next step of the process, the built-up agglomerates are inputted into a fluid bed dryer in which the agglomerates are dried and agglomerated to a median particle size of from about 300 microns to about 700 microns, more preferably from about 325 microns to about 450 microns. The density of the agglomerates formed is from about 300 g/l to about 550 g/l, more preferably from about 350 g/l to about 500 g/l, and even more preferably from about 400 g/l to about 480 g/l. All of these densities are generally below that of typical detergent compositions formed of dense agglomerates or most typical spray-dried granules.

A binder as described previously is preferably added during this step to enhance formation of the desired agglomerates. In this regard, a particularly preferred binder is liquid sodium silicate in an amount of from about 0.1% to about 20% by weight of the final low density composition. The nozzle height through which the binder is added is preferably from about 25 cm to about 60 cm, more preferably from about 30 cm to about 60 cm, most preferably from about 40 cm to about 60 cm, and even more preferably at 40 cm, from the distribution plate of the fluid bed dryer. Preferably all of the nozzles used in the fluid bed drying apparatus have such a height arrangement. Unexpectedly, it has been found that by selecting the nozzle height to be within the aforementioned ranges, superior low density agglomerates are produced in the process from both a low density and free flowability standpoint.

Additionally, the benefits of the process in this regard can be enhanced by maintaining the spray-on flux of the binder in the fluid bed to be from about 0.02 $kg/cm^2/hr$ to about 0.06 $kg/cm^2/hr$, more preferably from about 0.04 $kg/cm^2/hr$ to about 0.05 $kg/cm^2/hr$. Preferably, the air inlet temperature in the fluid bed dryer is from about 100° C. to about 200° C., more preferably from about 110° C. to about 130° C. Also, the unfluidized bed height in fluid bed dryer is preferably from about 5 cm to about 20 cm. It has also been found that the process benefits can be enhanced by maintaining the fluidized air flux in the fluid bed dryer is from about 0.6 kg/m2/s to about 0.8 $kg/m^2/s$. It has also been found beneficial to add the binder simultaneously at more than one location in one or more of the steps of the process. For example, the liquid silicate can be added at two locations in the fluid bed dryer, e.g., at or near the inlet port and at or near the exit port. Also, the median binder droplet diameter is from about 20 microns to about 150 microns, a parameter which enhances formation of the desired built-up agglomerates. Further in this regard, the ratio of the median binder droplet diameter to built-up agglomerate (exiting the second high speed mixer) particle diameter is preferably from about 0.1 to about 0.6.

Optionally, the process may involve adding the binder to both the second high speed mixer as well as the fluid bed dryer. It has also been found beneficial to add the binder simultaneously at more than one location in one or more of the steps of the process. For example, the liquid silicate can be added at two locations in the fluid bed dryer, e.g., at or near the inlet port and at or near the exit port. As with the first and second steps of the process, the agglomerates are built-up from smaller sizes to large sized particles having a high degree of intraparticle porosity. The degree of intraparticle porosity is preferably from about 20% to about 40%, and most preferably from about 25% to about 35%. The intraparticle porosity can be conveniently measured by standard mercury porosimetry testing.

Other optional steps contemplated by the present process include screening the oversized detergent agglomerates in a screening apparatus which can take a variety of forms including but not limited to conventional screens chosen for the desired particle size of the finished detergent product. Other optional steps include conditioning of the detergent agglomerates by subjecting the agglomerates to additional drying and/or cooling by way of apparatus discussed previously.

Another optional step of the instant process entails finishing the resulting detergent agglomerates by a variety of processes including spraying and/or admixing other conventional detergent ingredients. For example, the finishing step encompasses spraying perfumes, brighteners and enzymes onto the finished agglomerates to provide a more complete detergent composition. Such techniques and ingredients are well known in the art.

Deterrent Surfactant Paste or Precursor

The liquid acid precursor of anionic surfactant is used in the first step of the process, and in optional embodiments, as a liquid binder in the second and/or third essential steps of the process. This liquid acid precursor will typically have a viscosity measured at 30° C. of from about 500 cps to about 5,000 cps. The liquid acid is a precursor for the anionic surfactants described in more detail hereinafter. A detergent surfactant paste can also be used in the process and is preferably in the form of an aqueous viscous paste, although other forms are also contemplated by the invention. This so-called viscous surfactant paste has a viscosity of from about 5,000 cps to about 100,000 cps, more preferably from about 10,000 cps to about 80,000 cps, and contains at least about 10% water, more preferably at least about 20% water. The viscosity is measured at 70° C. and at shear rates of about 10 to 100 $sec.^{-1}$. Furthermore, the surfactant paste, if used, preferably comprises a detersive surfactant in the amounts specified previously and the balance water and other conventional detergent ingredients.

The surfactant itself, in the viscous surfactant paste, is preferably selected from anionic, nonionic, zwitterionic, ampholytic and cationic classes and compatible mixtures thereof. Detergent surfactants useful herein are described in U.S. Pat. No. 3,664,961, Norris, issued May 23, 1972, and in U.S. Pat. No. 3,919,678, Laughlin et al., issued Dec. 30, 1975, both of which are incorporated herein by reference. Useful cationic surfactants also include those described in U.S. Pat. No. 4,222,905, Cockrell, issued Sep. 16, 1980, and in U.S. Pat. No. 4,239,659, Murphy, issued Dec. 16, 1980, both of which are also incorporated herein by reference. Of the surfactants, anionics and nonionics are preferred and anionics are most preferred.

Nonlimiting examples of the preferred anionic surfactants useful in the surfactant paste, or from which the liquid acid precursor described herein derives, include the conventional $C_{10}$–$C_{18}$alkyl benzene sulfonates ("LAS"), primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+)$ $CH_3$ and $CH_3$ $(CH_2)_y(CHOSO_3^-$ $M^+)$ $CH_2CH_3$ where x and (y+1) are integers of at least about 7, preferably at least about 9, and M is a 510 water-solubilizing cation, especially sodium, unsaturated sulfates such as oleyl sulfate, and the $C_{10}$–$C_{18}$ alkyl alkoxy sulfates ("$AE_xS$"; especially EO 1-7 ethoxy sulfates).

Optionally, other exemplary surfactants useful in the paste of the invention include and $C_{10}$–$C_{18}$ alkyl alkoxy carboxylates (especially the EO 1-5 ethoxycarboxylates), the $C_{10-18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}C_{18}$ N-methylglucamides. See WO 9,206,154. Other sugar-derived surfactants include the N-alkoxy polyhydroxy fatty acid amides such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

Dry Detergent Material

The starting dry detergent material of the present process preferably comprises a builder and other standard detergent ingredients such as sodium carbonate, especially when a liquid acid precursor of a surfactant is used as it is needed as a neutralizing agent in the first step of the process. Thus, preferable starting dry detergent material includes sodium carbonate and a phosphate or an aluminosilicate builder which is referenced as an aluminosilicate ion exchange material. A preferred builder is selected from the group consisting of aluminosilicates, crystalline layered silicates, phosphates, carbonates and mixtures thereof. Preferred phosphate builders include sodium tripolyphosphate, tetrasodium pyrophosphate and mixtures thereof. Additional specific examples of inorganic phosphate builders are sodium and potassium tripolyphosphate, pyrophosphate, polymeric metaphosphate having a degree of polymerization of from about 6 to 21, and orthophosphates. Examples of polyphosphonate builders are the sodium and potassium salts of ethylene diphosphonic acid, the sodium and potassium salts of ethane 1-hydroxy- 1, 1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, all of which are incorporated herein by reference.

The aluminosilicate ion exchange materials used herein as a detergent builder preferably have both a high calcium ion exchange capacity and a high exchange rate. Without intending to be limited by theory, it is believed that such high calcium ion exchange rate and capacity are a function of several interrelated factors which derive from the method by which the aluminosilicate ion exchange material is produced. In that regard, the aluminosilicate ion exchange materials used herein are preferably produced in accordance with Corkill et al, U.S. Pat. No. 4,605,509 (Procter & Gamble), the disclosure of which is incorporated herein by reference.

Preferably, the aluminosilicate ion exchange material is in "sodium" form since the potassium and hydrogen forms of the instant aluminosilicate do not exhibit the as high of an exchange rate and capacity as provided by the sodium form. Additionally, the aluminosilicate ion exchange material preferably is in over dried form so as to facilitate production of crisp detergent agglomerates as described herein. The aluminosilicate ion exchange materials used herein preferably have particle size diameters which optimize their effectiveness as detergent builders. The term "particle size diameter" as used herein represents the average particle size diameter of a given aluminosilicate ion exchange material as determined by conventional analytical techniques, such as microscopic determination and scanning electron microscope (SEM). The preferred particle size diameter of the aluminosilicate is from about 0.1 micron to about 10 microns, more preferably from about 0.5 microns to about 9 microns. Most preferably, the particle size diameter is from about 1 microns to about 8 microns.

Preferably, the aluminosilicate ion exchange material has the formula $$Na_z[(AlO_2)_z.(SiO_2)_y]xH_2O$$

wherein z and y are integers of at least 6, the molar ratio of z to y is from about 1 to about 5 and x is from about 10 to about 264. More preferably, the aluminosilicate has the formula $$Na_{12}[(AlO_2)_{12}.(SiO_2)_{12}]xH_2O$$

wherein x is from about 20 to about 30, preferably about 27. These preferred aluminosilicates are available commercially, for example under designations Zeolite A, Zeolite B and Zeolite X. Alternatively, naturally-occurring or synthetically derived aluminosilicate ion exchange materials suitable for use herein can be made as described in Krummel et al, U.S. Pat. No. 3,985,669, the disclosure of which is incorporated herein by reference.

The aluminosilicates used herein are further characterized by their ion exchange capacity which is at least about 200 mg equivalent of $CaCO_3$ hardness/gram, calculated on an anhydrous basis, and which is preferably in a range from about 300 to 352 mg equivalent of $CaCO_3$ hardness/gram. Additionally, the instant aluminosilicate ion exchange materials are still further characterized by their calcium ion exchange rate which is at least about 2 grains $Ca^{++}$/gallon/minute/-gram/gallon, and more preferably in a range from about 2 grains $Ca^{++}$/gallon/minute/-gram/gallon to about 6 grains $Ca^{++}$/gallon/minute/-gram/gallon.

Adjunct Detergent Ingredients

The starting dry detergent material in the present process can include additional detergent ingredients and/or, any number of additional ingredients can be incorporated in the detergent composition during subsequent steps of the present process. These adjunct ingredients include other detergency builders, bleaches, bleach activators, suds boosters or suds suppressors, anti-tarnish and anticorrosion agents, soil suspending agents, soil release agents, germicides, pH adjusting agents, non-builder alkalinity sources, chelating agents smectite clays, enzymes, enzyme-stabilizing agents and perfumes. See U.S. Pat. 3,936.537, issued Feb. 3, 1976 to Baskerville, Jr. et al., incorporated herein by reference.

Other builders can be generally selected from the various borates, polyhydroxy sulfonates, polyacetates, carboxylates, citrates, tartrate mono- and di-succinates, and mixtures thereof. Preferred are the alkali metal, especially sodium, salts of the above. In comparison with amorphous sodium silicates, crystalline layered sodium silicates exhibit a clearly increased calcium and magnesium ion exchange capacity. In addition, the layered sodium silicates prefer magnesium ions over calcium ions, a feature necessary to insure that substantially all of the "hardness" is removed from the wash water. These crystalline layered sodium silicates, however, are generally more expensive than amorphous silicates as well as other builders. Accordingly, in order to provide an economically feasible laundry detergent, the proportion of crystalline layered sodium silicates used must be determined judiciously.

The crystalline layered sodium silicates suitable for use herein preferably have the formula $$NaMSi_xO_{2x+1}.yH_2O$$

wherein M is sodium or hydrogen, x is from about 1.9 to about 4 and y is from about 0 to about 20. More preferably, the crystalline layered sodium silicate has the formula $$NaMSi_2O_5.yH_2O$$

wherein M is sodium or hydrogen, and y is from about 0 to about 20. These and other crystalline layered sodium silicates are discussed in Corkill et al, U.S. Pat. No. 4,605,509, previously incorporated herein by reference.

Examples of nonphosphorus, inorganic builders are tetraborate decahydrate and silicates having a weight ratio of $SiO_2$ to alkali metal oxide of from about 0.5 to about 4.0, preferably from about 1.0 to about 2.4. Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Polymeric polycarboxylate builders are set forth in U.S. Pat. No. 3,308,067, Diehl, issued Mar. 7, 1967, the disclosure of which is incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylene malonic acid. Some of these materials are useful as the water-soluble anionic polymer as hereinafter described, but only if in intimate admixture with the non-soap anionic surfactant.

Other suitable polycarboxylates for use herein are the polyacetal carboxylates described in U.S. Pat. No. 4,144,226, issued Mar. 13, 1979 to Crutchfield et al, and U.S. Pat. No. 4,246,495, issued Mar. 27, 1979 to Crutchfield et al, both of which are incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a detergent composition. Particularly preferred polycarboxylate builders are the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Bleaching agents and activators are described in U.S. Pat. No. 4,412,934, Chung et al., issued Nov. 1, 1983, and in U.S. Pat. No. 4,483,781, Hartman, issued Nov. 20, 1984, both of which are incorporated herein by reference. Chelating agents are also described in U.S. Pat. No. 4,663,071, Bush et al., from Column 17, line 54 through Column 18, line 68, incorporated herein by reference. Suds modifiers are also optional ingredients and are described in U.S. Pat. Nos. 3,933,672, issued Jan. 20, 1976 to Bartoletta et al., and 4,136,045, issued Jan, 23, 1979 to Gault et al., both incorporated herein by reference.

Suitable smectite clays for use herein are described in U.S. Pat. No. 4,762,645, Tucker et al, issued Aug. 9, 1988, Column 6, line 3 through Column 7, line 24, incorporated herein by reference. Suitable additional detergency builders for use herein are enumerated in the Baskerville patent, Column 13, line 54 through Column 16, line 16, and in U.S. Pat. No. 4,663,071, Bush et al, issued May 5, 1987, both incorporated herein by reference.

In order to make the present invention more readily understood, reference is made to the following example, which is intended to be illustrative only and not intended to be limiting in scope.

EXAMPLE

This Example illustrates the process invention in which a low density agglomerated detergent composition is prepared. A Lödige CB 30 high speed mixer is charged with a mixture of powders, namely sodium carbonate (median particle size 15 microns) and sodium tripolyphosphate ("STPP") with a median particle size of 25 microns. A liquid acid precursor of sodium alkylbenzene sulfonate surfactant ($C_{12}H_{25}$—$C_6H_4$—$SO_3$—H or "HLAS" as noted below) and a 70% active aqueous $C_{10-18}$ alkyl ethoxylated sulfate surfactant (EO=3, "AES") paste are also inputted into the L ödige CB 30 mixer, wherein the HLAS is added first. The mixer is operated at 1600 rpm and the sodium carbonate, STPP, HLAS and AES are formed into agglomerates having a median particle size of about 110 microns after a mean residence time in the Lödige CB 30 mixer of about 5 seconds. The agglomerates are then fed to a Schugi (Model #FX160) high speed mixer which is operated at 2800 rpms with a mean residence time of about 2 seconds. A HLAS binder is inputted into the Schugi (Model #FX160) mixer during this step which results in built-up agglomerates having a median particle size of about 180 microns being formed. Thereafter, the built-up agglomerates are passed through a four-zone fluid bed dryer which is operated at an air inlet temperature of about 125° C. and a nozzle height of 40 cm from the distribution plate in the first and fourth zones of the fluid bed. The spray-on flux of the sodium silicate in 0.04 kg/cm$^2$/hr, the unfluidized bed height is 10 cm, and the fluidized air flux is 0.6 kg/m$^2$/s. In the amounts and particle size specified below, fines are also added to the Lödige CB 30 mixer. In the first and fourth zones of the fluid bed dryer, liquid sodium silicate is fed into the fluid bed dryer resulting in the finished detergent agglomerates having a density of about 485 g/l and a median particle size of about 360 microns. Unexpectedly, the finished agglomerates have excellent physical properties in that they are free flowing as exhibited by their superior cake strength grades.

The composition of the agglomerates are given below in Table I.

TABLE I

| Component | I |
|---|---|
| | (% weight) |
| LAS (Na) | 15.8 |
| AES (EO = 3) | 4.7 |
| Sodium carbonate | 48.0 |
| STPP | 22.7 |
| Sodium Silicate | 5.5 |
| Water | 3.3 |
| | 100.0 |

The agglomerates embody about 14% of fines (less than 150 microns) which are recycled from the fluid bed back into the Lödige CB 30 which enhances production of the agglomerates produced by the process.

Having thus described the invention in detail, it will be clear to those skilled in the art that various changes may be made without departing from the scope of the invention and the invention is not to be considered limited to what is described in the specification.

What is claimed is:

1. A process for preparing a low density detergent composition characterized by the steps of (a) agglomerating a detergent surfactant paste or precursor thereof and dry starting detergent material in a first high speed mixer to obtain agglomerates;

(b) mixing said agglomerates in a second high speed mixer to obtain built-up agglomerates; and (c) feeding said built-up agglomerates into a fluid bed dryer in which a binder is sprayed via a nozzle having a height of from 25 cm to 60 cm from the distributor plate of said fluid bed dryer such that said built-up agglomerates are dried and agglomerated to form said low detergent agglomerates having a density in a range from 300 g/l to 550 g/l.

2. The process of claim 1 wherein said binder is sodium silicate.

3. The process of claim 1 wherein said binder has a spray-on flux of from about 0.02 kg/cm$^2$/hr to about 0.06 kg/cm$^2$/hr.

4. The process of claim 1 wherein the air inlet temperature of said fluid bed dryer is from about 110° C. to about 130° C.

5. The process of claim 1 wherein said binder has a median diameter droplet of from about 20 microns to about 100 microns.

6. The process of claim 1 wherein the fluidized air flux in said fluid bed dryer is from about 0.6 kg/m$^2$/s to about 0.8 kg/m$^2$/s.

7. The process of claim 1 wherein said step (a) includes agglomerating a liquid acid precursor of $C_{11-18}$ linear alkylbenzene sulfonate surfactant and a $C_{10-18}$ alkyl ethoxylated sulfate surfactant.

8. The process of claim 1 wherein said binder is added at the inlet and exit ports of said fluid bed dryer.

9. The process of claim 1 wherein said nozzle height is from about 35 cm to about 45 cm.

10. A process for preparing a low density detergent composition comprising the steps of:

(a) agglomerating a detergent surfactant paste or precursor thereof and dry starting detergent material in a first high speed mixer to obtain agglomerates;

(b) mixing said agglomerates in a second high speed mixer to obtain built-up agglomerates;

and (c) feeding said built-up agglomerates into a fluid bed dryer in which sodium silicate is sprayed via a nozzle having a height of from about 40 cm to about 60 cm from the distributor plate of said fluid bed dryer such that said built-up agglomerates are dried and agglomerated to form said low detergent agglomerates having a density in a range from about 300 g/l to about 550 g/l.

11. The process of claim 10 wherein said sodium silicate has a spray-on flux of from about 0.02 kg/cm$^2$/hr to about 0.06 kg/cm$^2$/hr.

12. The process of claim 10 wherein the unfluidized bed height in said fluid bed dryer is form about 5 cm to about 20 cm.

13. The process of claim 10 wherein the air temperature in said fluid bed dryer is from about 110° C. to about 130° C.

14. The process of claim 10 wherein said dry starting detergent material having a median particle size in a range from about 20 microns to about 50 microns.

15. The process of claim 10 wherein said detergent agglomerates have a density of from about 350 g/l to about 500 g/l.

16. The process of claim 10 wherein said dry starting material comprises a builder selected from the group consisting of aluminosilicates, crystalline layered silicates, phosphates, and mixtures thereof.

17. The process of claim 10 wherein said step (a) includes agglomerating a liquid acid precursor of $C_{11-18}$ linear alkylbenzene sulfonate surfactant and a $C_{10-18}$ alkyl ethoxylated sulfate surfactant.

18. The process of claim 10 wherein said nozzle height is about 40 cm.

* * * * *